Jan. 26, 1965  J. K. HUGHES  3,167,066
RADIANT HEATING
Filed July 12, 1962
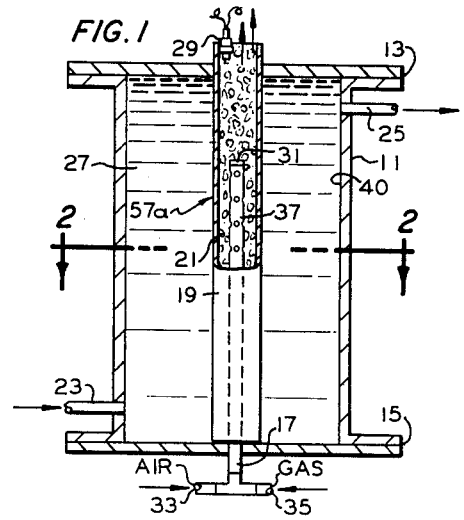
INVENTOR.
J. K. HUGHES
BY Young & Quigg
ATTORNEYS

United States Patent Office 3,167,066
Patented Jan. 26, 1965

3,167,066
RADIANT HEATING
James K. Hughes, Bartlesville, Okla., assignor to Phillips Petroleum Company, a corporation of Delaware
Filed July 12, 1962, Ser. No. 209,400
5 Claims. (Cl. 126—359)

This invention relates to radiant heating. In one aspect it relates to a method for the radiant heating of fluids and apparatus therefor. In another aspect it relates to a method and apparatus for radiant heating of space.

Radiant heaters are not new to the art, because the radiant transmission of heat energy, when practical, is the most efficient means for heating a material mass. The log fire, the gas radiant home heater, the infra-red lamp, solar furnaces, and the like, are examples of this form of heat transmission.

Most space heaters and furnaces radiate energy in the form of electro-magnetic waves. However, the amount of energy absorbed at the wave length radiated per unit of fuel per area of radiating surface is small compared to the energy transmitted to absorbers by conduction and convection.

An object of this invention is to provide improved method and apparatus for radiant heating. Another object of this invention is to provide a more efficient method and apparatus than conventional methods and apparatus for radiant heating. Another object of this invention is to provide a burner in which the effluent combustion gases are only mildly heated. Yet another object of this invention is to provide a heater assembly which is capable of concentrating radiant heat energy from one or more burners on a single heat absorber or dispersing radiant heat from a single burner for absorption by a single absorber or a plurality of absorbers. Still other objects and advantages of this invention will be realized upon reading the following description which, taken with the attached drawing, forms a part of this specification.

I achieve the above objects by mixing fuel and oxidant, preferably under pressure, in a closed conduit terminating in a perforate section surrounded by solid refractory particles held in place by a wall of a material having good heat radiation properties.

In utilizing the invention, objects to be heated are spaced from the radiating wall or substantially in contact therewith. When the spaced-apart relationship between heater and absorber exists, it will be beneficial to surround the burner with radiation reflecting means. The object to be heated, or absorber, is placed in or near one focus of the reflecting means. Where dispersion for uniform heating of relatively large areas is desired, a burner is located at the focal point and the object in a location of dispersion in an optical system. In using an ellipsoidal system, it is convenient to locate a burner at one focal point with the absorber at the other. In more complex systems several burners are positioned at focal points of individual ellipses and a single absorption medium is positioned at the other focal points of the several ellipses, these other focal points being common to all the ellipses. This system can be reversed with a burner located at a focal point common to a family of ellipsoidal reflectors with absorbers located at one or more of the other focal points.

In art related to burners it has been customary to utilize refractory pebbles as a heat sink for storing energy to be utilized in chemical reactions, space heating, water heating, gas heating, and the like. In general, the space heating process is detrimental to attainment of full utility of stored energy of pebbles, because in each case the pebbles, or refractory masses, are confined by insulated walls designed to increase the concentration of heat in the combustion zone for the purpose of elevating temperature therein. Space heating effect also enters, and consequently, a large portion of the combustion heat is absorbed by inert combustion products, especially nitrogen, which transports heat relatively large distances from the combustion zone before exchanging heat with the refractory surfaces. In this type of burner heat recovery sections downstream of the combustion zone are utilized to recover heat from the combustion products. In moving bed systems for heating hydrocarbons, direct contact of the hydrocarbons with the hot pebbles forms tarry-like reaction products, which deposit on the walls of the container and which are carbonized by heat radiated from the pebble mass. Thus, in pebble heaters the radiant energy effect is detrimental to the over-all operation.

In order to overcome shortcomings of the heated refractory masses, either moving or fixed bed, the Selas burner was developed. This burner operates on the gas-fired radiant principle, but requires several highly complex, special refractory shapes to produce an essentially unidirectional beam of somewhat limited usefulness.

In the drawing, FIGURE 1 is an elevational view, partly in section, of one embodiment of apparatus of this invention. FIGURE 2 is a sectional view taken on the line 2—2 of FIGURE 1. FIGURE 3 is an elevational view, partly in section, of another embodiment of this invention. FIGURE 4 is a plan view of a heater assembly of this invention. FIGURE 5 is a sectional view taken on the line 5—5 of FIGURE 4.

In FIGURE 1 of the drawing, reference numeral 11 identifies a generally cylindrical housing member closed by flanges 13 and 15 at its ends. A tube 17 extends through the bottom flange 15 into body member 11 with the portion within the body member being perforated. Perforations in tube 17 are identified by reference numeral 37. The end of tube 17 within housing member 11 is closed at 31. The outer end of tube 17 is connected with conduits 33 and 35 which respectively conduct air and gas from sources, not shown, to tube 17.

Surrounding tube 17 inside body member 11 is a tubular member 19, which is nonperforate. This tubular member 19 is sealed fluid-tight to the upper surface of flange 15 and extends through an opening in upper flange 13 in the fluid-tight manner. Tubular member 19 is sufficiently greater in diameter than tube 17 that an annular space is provided between them suitable for accommodation of broken pieces of ceramic material 21 in a random packing form. Reference numeral 29 identifies an ignition means, such as a spark plug.

Other suitable means for igniting gas issuing from the upper end of tubular member 19 can be used, as desired. A conduit 23 is provided for inlet of fluid to be heated and a conduit 25 is for exit of this fluid. Reference numeral 27 identifies fluid to be heated in the space between the inner surface of housing member 11 and the outer surface of the tubular member 19.

FIGURE 2 is a sectional view of the heater of FIGURE 1.

FIGURE 3 illustrates an alternate embodiment of the invention and comprises a tubular member or sleeve 39 which is nonperforate. This tubular member 39 is positioned in a base plate 43 provided with an opening 47 in such a manner that the tubular member 39 is lightly held therein. Base plate 43 rests on a floor plate 44, both of which are provided with openings through which a tubular member 41 extends. Plate 43 is held to the base plate by bolts or by welds, not shown. The portion of the tubular member 41 within tubular member 39 is perforated. The upper end of tubular member 41, that is, the end portion within the tubular member 39, is closed by a plug 45. The outer and nonperforate portion of tubular member 41 extends below the base plate 43 and floor plate 44 and is connected to conduits 49 and 51 for inlet of air and gas, respectively, from sources, not shown.

In FIGURE 3 the space between the tubular members 39 and 41 is packed in random manner with broken ceramic material. The upper end of the tubular member 39 is open at 53 through which the ceramic packing material 55 can be observed.

FIGURE 4 illustrates a multiple heater assembly in which there is a plurality of burners employed for heating a single conduit containing a fluid passing therethrough.

In FIGURE 4 there is illustrated six burners 57. These burners can, if desired, be similar to the burner illustrated in FIGURE 1. In the construction of this heater assembly a central conduit 61 is provided through which passes a fluid 63 to be heated. Reference numeral 63a identifies the axis of the tubular member 61. Surrounding tubular member 61 and at a spaced distance therefrom are provided several burners 57. In this embodiment burners 57 are equally spaced around the circumference of a circle with focus 63a as a center. Wall members 71, that is, one wall member for each burner, are positioned in such a manner as to make a continuous wall surrounding the tubular member and the burners. The inner surface of each wall member 71 is highly reflecting to radiant heat. Each of the burners 57 is so positioned that one of its axes coincides with a focus of the adjacent wall member 71, the cross-section of which is a portion of an ellipse. Thus, each of the wall members 71 is a portion of an ellipse with its burner positioned adjacent thereto and being positioned on one focus of the ellipse. The center or axis of the conduit 61 is positioned at the other focus or common focus of each of the several ellipses.

Reference numeral 67 identifies radiant heat waves emitted by burners 57. These heat waves radiate from the burners and are reflected by the inner surfaces of the wall members 71 and are concentrated at the common focus 63a. However, the wall of conduit 61 is positioned in the path of each of these rays in such a manner that heat reflected from each of the several burners is concentrated around the periphery of this conduit. In this manner heating is quite efficient and liquid or gas in conduit 61 can be heated at relatively high rates. Reference numeral 68 identifies lines of juncture between adjacent elliptical wall members 71. These lines or junctures are straight lines parallel to the axis of burners 57 and parallel to the axis of conduit 61.

The inner surface 40 of body member 11 of FIGURE 1 and the inner surface 59 of the wall members 71 of FIGURE 4 are constructed of highly reflecting materials, such as stainless steel, chromium plated metal, and metallized quartz. The tubular members 19 and 39 are constructed of materials, such as stainless steel, steel, or titanium, as will pass or conduct heat therethrough quite efficiently. Also, materials can be used which are transparent to heat originating inside these tubular members, such as quartz and germanium. Other suitable ceramic material such as carborundum, silica-aluminum metal filings, and stainless steel-silicon-dioxide can be used in place of the broken porcelain plate 55. The ceramic materials 21, 55 promote efficient flameless combustion.

*Specific Example*

A burner was constructed along the lines illustrated in FIGURE 3 in the following manner. A two-inch diameter metallic base 43 about 1 inch thick was provided with an opening of about 1½ inch in diameter and about ½ inch deep in its upper surface. A ⅝-inch O.D. (¼-inch pipe) mild steel nipple extended through a central opening in the portion of the base below the cavity. This mild steel nipple corresponds to tubular member 41 and it extended about 2½ inches above the floor of the cavity and was closed at its upper end with a ¼-inch machine screw extending into the nipple about ½ inch. The walls of this nipple were perforated by a plurality of 1/16-inch diameter holes drilled radially and an approximately ¼-inch centers in both directions. A 1½-inch outside diameter brass tube about 1/16-inch thick and 3½ inches long was inserted into the base cavity with which it made a loose contact. Chips from an unglazed ceramic plate about 5/32-inch thick and broken into pieces having approximate particle size averaging about 5/32 inch by ½ inch by ¼ inch in the three dimensions were randomly placed in the annular space between the two vertical tubular members until the top of the inner tubular member was covered by about ½ inch or a little more of the chips. Conduits corresponding to conduits 49 and 51 were attached to the bottom end of the inner tubular member corresponding to member 41 for inlet of air and fuel gas.

In operation, air under pressure was introduced through conduit 49 at a rate so that a gas stream above the burner was apparent to the hand at a height of about 1 foot above the burner. Gas was then turned on through conduit 51 to provide a combustible mixture at the top end of the outer tube 39. As soon as sufficient gas issued from the upper end 53 of this burner the mixture was ignited and allowed to burn. The flame was pulled down into the refractory pieces by reducing the rate of gas flow, and the chips quickly began to glow followed in about one minute by glowing of the outer tubing 39. Flameless surface combustion was apparent. On holding the hand in the gas stream above the burner, it was found that the off-gas was only moderately warm.

The burner illustrated in FIGURE 3 and one similar to that just described but somewhat larger in dimensions can be used for space heating purposes since heat is radiated from the outer tubular member corresponding to member 39 in all horizontal directions.

The heating apparatus of FIGURE 1 is used for heating a liquid or for heating a gas, with the fluid being introduced through conduit 23 and withdrawn from the heater through conduit 25.

The apparatus of FIGURE 4 is used for rapid heating of the liquid or gas passing through conduit 61 which is positioned at a common focal point of the several reflectors identified by reference numeral 59. In this heater assembly heating of the fluid is very rapid because of the concentration of the radiant heat from, for example, six burners positioned as illustrated. The inner surface of the reflecting members 71, as mentioned hereinabove, is highly reflecting and the outer surface of the pipe 61 of a plant stream to be heated is either absorbing or transparent, preferably transparent, to radiant heat from the reflectors. The burners will operate at a temperature such that the radiation produced will be absorbed on penetrating the pipe surface or solution contained therein. The operation of the burner, that is, its temperature and the linear flow rate of fluid in pipe 61, will depend upon the material of construction and the material to be heated.

FIGURE 5 is a sectional view taken on the line 5—5 of FIGURE 4 and shows the straight line of juncture 68 and 69 of a pair of adjacent wall members having elliptical arc cross sections.

In one instance the heaters 57, 57a, of FIGURE 4 and the pipe 61 can be reversed in such a manner that a single heater 57 or 57a is placed at the common focal point 63a and a plurality of conduits corresponding to conduit 61 is positioned at the outlying focal points 65. In this manner the heating operation is just the reverse of that described hereinabove to FIGURE 4. That is, heat radiating from the source at the common focal point radiates outwardly and the portions or the heat rays striking each of the respective reflecting surfaces 59 are concentrated at the respective pipes positioned coincident with the several focal points 65. In this manner a single burner can heat at least in a moderate manner several conduits through which material to be heated is passing. In addition to radiation being reflected by the inner surfaces 59 of the wall members 71 waves emerging from the heater at the common focal point radiate outwardly and directly contact the portions of the surfaces of the pipes facing the heater. Thus, in the manner illustrated in FIGURE 4 whether the liquid to be heated is at the common focal point or whether the heater is positioned at the common focal point direct heat waves assist the reflected waves in heating either the conduit at the common focal point or the several conduits at the individual focal points of the ellipses.

In one instance the inner and perforate tube 19 as illustrated in FIGURE 1 extended approximately 80 to 90 percent of the length of the nonperforate tube 19 within the body member 11.

While I have herein disclosed that cross sections of reflectors 59 are elliptical sections, these reflectors can be of the parabolic type. A parabolic reflector corresponding to reflector 59 should have a width, i.e., the shortest distance from points corresponding to points in FIGURE 4 identified by reference numerals 68 and 69, equal to the diameter of tubular member 61 through which fluid to be heated is passed. As is known in the optical art, having a point source of heat, a parabolic reflector reflects heat waves from the source as parallel rays. When the reflector has a parabolic cross section with its longitudinal section being a straight line, a section of pipe, such as member 61, is directly heated when the source of heat is an elongated burner, as burners 57 and 57a. A plurality of burners positioned on the circumference of a circle with reflectors directing heat toward the center of the circle heats all sides of the heating pipe.

In the case illustrated in FIGURE 4, when the burner is placed at the center of this figure and the tubular members to be heated are placed at the positions occupied by members 57, 57a parallel heat rays pass from the face of the burner facing the respective member to be heated and these parallel heat rays are then reflected toward the axis of the respective members to be heated.

While certain embodiments of the invention have been described for illustrative purposes, the invention obviously is not limited thereto.

I claim:
1. A burner comprising:
    (1) an injection tube closed at one end, having gas inlet means at the other end, and provided with cylindrical radial holes of small diameter spaced uniformly on close centers both circumferentially and longitudinally;
    (2) a larger imperforate outer tube transparent to radiant heat, concentric with said injection tube to form an annulus therewith and closed at its end adjacent said inlet means;
    (3) gas outlet means in the other end of said outer tube;
    (4) particulate ceramic material randomly packed in said annulus; and
    (5) separate fuel gas and oxidant inlet lines connected with said gas inlet means.
2. The burner of claim 1 wherein said outer tube extends substantially beyond the closed end of said injection tube.
3. A method of heating a fluid stream which comprises the steps of:
    (1) passing said fluid stream thru an enclosed heating zone;
    (2) burning a combustible fuel-air mixture by flameless surface combustion in an enclosed annular bed of refractory aggregates adjacent said heating zone so as to heat said aggregates and cause same to emit at least a portion of said radiant heat radially into said heating zone;
    (3) injecting said mixture radially outwardly from an axial distribution zone directly into said bed along its inner periphery; and
    (4) withdrawing combustion gases from one end of said bed.
4. The method of claim 3 wherein at least another portion of said radiant heat is transmitted to an arcuate reflective surface having a focal axis and said heating zone is coaxial with said focal axis.
5. A radiant burner comprising in combination:
    (1) an injection tube closed at one end, having gas inlet means at the other end, and provided with radial holes of small bore substantially uniformly distributed in the wall thereof;
    (2) a larger imperforate outer tube transparent to radiant heat, concentric with the injection tube of (1) forming an annulus therewith, said outer tube being closed at its end adjacent the inlet means of (1);
    (3) a combustion gas vent in the other end of the outer tube of (2);
    (4) a packed mass of particulate, randomly packed ceramic aggregates in the annulus of (2); and
    (5) means for supplying a combustible gaseous mixture to the gas inlet means of (1).

References Cited in the file of this patent

UNITED STATES PATENTS

| | | |
|---|---|---|
| 1,213,470 | Finlay | Jan. 23, 1917 |
| 1,278,026 | Salto | Sept. 3, 1918 |
| 2,082,337 | Hays | June 1, 1937 |
| 2,927,187 | Wendelken | Mar. 1, 1960 |
| 3,061,416 | Kazokas | Oct. 30, 1962 |

FOREIGN PATENTS

| | | |
|---|---|---|
| 469,515 | Great Britain | July 27, 1937 |
| 625 | Great Britain | of 1911 |
| 789,345 | Great Britain | Jan. 22, 1958 |
| 1,056,454 | France | Oct. 21, 1953 |